April 9, 1968  G. VON BERNUTH  3,377,182

METHOD OF PRODUCING MONOCRYSTALLINE SEMICONDUCTOR BODIES

Filed March 26, 1964  2 Sheets-Sheet 1

United States Patent Office 3,377,182
Patented Apr. 9, 1968

3,377,182
METHOD OF PRODUCING MONOCRYSTALLINE SEMICONDUCTOR BODIES
Götz von Bernuth, Munich, Germany, assignor to Siemens Aktiengesellschaft, Berlin-Siemensstadt, Germany, a corporation of Germany
Filed Mar. 26, 1964, Ser. No. 354,862
Claims priority, application Germany, Mar. 27, 1963, S 84,388; Switzerland, Jan. 17, 1964, 501/64
7 Claims. (Cl. 117—4)

ABSTRACT OF THE DISCLOSURE

Described is a method of producing monocrystalline rods by growing semiconductor material, particularly silicon, from the gaseous phase of a chemical compound containing this material, on a monocrystalline core heated to a dissociation temperature of said compound, said core having been previously obtained by the same method. The invention is characterized by using as the core a prismatic rod whose axis is positioned in parallel with the (111) direction of the crystal lattice, and is sectioned from the monocrystalline-grown edge region of a thicker rod to form an equilateral hexagon as the cross section surface area of which either one corner or the center of one side is 30° off the (111) direction. The resulting monocrystalline body possesses throughout the properties desired for the intended application.

---

My invention relates to the production of monocrystalline semiconductor bodies, preferably from elemental material such as germanium or silicon, for use in rectifiers, transistors, and other semiconductor devices.

Semiconductor material for the production of wafers, plates, discs and other bodies as needed in such devices is usually obtained by thermal or pyrolytic dissociation of a chemical compound containing the semiconductor substance as a constituent. This is done in a reactor vessel, as shown, for example, in U.S. patents, No. 3,030,189, No. 3,057,690 and No. 3,068,078, by precipitating the dissociation substance upon a rod-shaped core heated to the pyrolytic temperature. The core also consists of the semiconductor material, such as germanium or silicon, and has a high degree of purity as required for electronic semiconductor devices. Generally, the chemical compound is supplied to the reaction vessel in form of a flow of vapor or gas. Aside from the chemical compound to be pyrolytically dissociated, the gas preferably contains a gaseous driving agent or diluent, such as hydrogen, which serves to promote the reaction or to additionally perform a chemical function during pyrolysis.

As a rule, the thickened body of semiconductor material thus grown on the original core rod is predominantly polycrystalline. Since, usually, the wafers or plates to be cut from such a product for use in electrical semiconductor devices must be monocrystalline, it is necessary to convert the product to monocrystalline constitution. This has been done by fusing a monocrystalline seed to one end of the polycrystalline or mixed-crystalline rod and then subjecting the rod-seed assembly to zone melting. While the bulk of the rod can thus be converted to a monocrystal, an appreciable amount of additional equipment and time is needed and crystal defects, particularly dislocations, may be caused or augmented, thus impairing the desired perfection of the crystalline constitution.

The necessity for zone melting is avoided by the method described in the copending application of H. Sandmann, Ser. No. 300,763, filed Aug. 8, 1963, assigned to the assignee of the present invention. According to that method, the core used for pyrolytic crystal growing, otherwise performed as described above, consists of a rod-shaped monocrystal whose longitudinal axis coincides with a crystal axis and whose surface is treated by removal of material to impart to the monocrystal a polygonally prismatic shape so oriented that active ends of crystal lattice planes are located at the prism lateral faces. When the same semiconductor substance of which the prismatic core consists, such as silicon, is pyrolytically precipitated upon such a prismatic rod, it grows in monocrystalline constitution. The resulting thickened body therefore is monocrystalline and can be used directly as semiconductor material in electronic and other semiconductor devices. That is, the required wafers or discs can be sliced off without preceding zone melting.

My invention, more specifically, relates to a process of growing semiconductor monocrystals on the principle of the just-mentioned method set forth in the above-identified copending application, and has for its object to further improve such method toward increased reliability, particularly with respect to accurately obtaining predetermined precise electrical qualities in the resulting products and, in another aspect, toward greater versatility with respect to the type of product thus obtainable.

More particularly, it is an object of my invention to make certain that the growing process directly results in semiconductor rods which precisely and reliably exhibit throughout their entire utilizable volume the particular properties desired for the specific use in a given electronic semiconductor device.

I have discovered that such improvements are achieved by selecting from the outset, on the one hand, the gaseous atmosphere used in the pyrolytic growing process and, on the other hand, the core rods employed in the same growing process, in mutual and joint adaptation to the properties of the slices or ultimate monocrystalline bodies to be obtained.

The just-mentioned mutual adaptation of gas and core involves one or more of the properties: the electric specific resistance of the core material and the corresponding electric resistance of the precipitate resulting from the gas; the composition of the core and the composition of the gas; the impurities contained in the core and those contained in the gas; the addition of dopant substances contained in the core and admixed to the gas; the crystal lattice structure of the core and that of the material precipitating from the gas. Such an adaptation can be effected with an extremely high accuracy with the result that the thick rods of monocrystalline constitution resulting from the pyrolytic process, and consequently the semiconductor wafers sliced from such rods, will accurately exhibit the ultimately desired semiconductor properties. Hence even such uses which in this respect permit of only very slight tolerances, no longer require subsequently investigating the properties of the monocrystalline products and then making a choice among the pieces cut from the product or among different localities of the product.

For many electronic semiconductor devices the monocrystalline discs or wafers transversely sliced from a rod must possess completely uniform properties over its entire area. Consequently, a prismatic, for example hexagonal, rod grown from silicon, must possess uniform properties over its entire cross section, particularly an accurately constant specific resistance. In this case, the method of the invention is performed by preparing a prismatic core of monocrystalline material which has the same specific resistance as the one desired in the ultimate wafers, and the gaseous atmosphere employed for the pyrolytic growth of material on the prismatic core is given the composition at which the precipitating growth of material also possesses the same specific electric resistance. As a rule, in such cases, the core material and the gas composition are such that the resulting core region and the additionally grown jacket region, both being monocrystalline and integral, contain the same impurities in exactly the same and predetermined concentration.

Conversely, in cases where the gas or gaseous mixture employed for the pyrolytic growing process is available in a given constitution, the material for the core must be so chosen that it possesses the same electric resistance or the same impurities in exactly the same and predetermined concentration as the material pyrolytically precipitating from the gas.

In cases where a gas of given composition is taken as the starting point, one way of securing identical properties of the core and of the subsequently grown jacket zone is as follows. The pyrolytic process is performed with the aid of the same gas as the one to be used ultimately, and under exactly the same operating conditions, except that the core originally employed, although consisting of the same material as the one being precipitated, is picked more or less at random and hence does not necessarily possess exactly the same properties as the material grown thereupon by pyrolytic precipitation. Thereafter the properties, such as the impurity content or specific resistance of the pyrolytically precipitated material are ascertained by testing. That is, only the material in the outer jacket zone is thus tested. The properties thus ascertained are identical with those of the material that will thereafter precipitate from the same gaseous atmosphere when the production process proper is being carried out. Now, from a number of available monocrystalline rods, which may include rods produced in the same manner or in any other desired manner, those particular ones can be selected that exhibit the properties known from the preliminary test. The selected core is then employed with the above-mentioned gas for actual production of the desired monocrystalline bodies, then having throughout the same specific resistance as the material preliminarily tested.

According to another and preferred mode of performing the method of the invention, the cores of the desired, predetermined properties are produced directly from the jacket zone of a preliminary core. Employed as a preliminary or primary core is any monocrystalline core regardless of whether or not it has the ultimately required constitution. Precipitated upon this preliminary core is a jacket zone by a pyrolytic growing process accurately identical with the one subsequently to be carried out in actual production. Thereafter, new (secondary) core rods are cut lengthwise out of the resulting jacket zone and are given the above-mentioned prismatic shape so that their longitudinal axis is parallel to a crystal axis and the ends of lattice planes are located at the perimetric faces. The latter cores are then used for the pyrolytic production of those monocrystalline semiconductor rods that are to possess the ultimately required electrical constitution.

According to a modification of the process according to the invention, the selection of the material for the core may also take into account any differences in properties that are to be present in the ultimate wafers or slices to be produced. This possibility is afforded by virtue of the fact that the monocrystalline rods, once grown in accordance with the invention, are not and need not be subjected to zone melting and consequently preserve their constitution or distribution with respect to properties. For example, it is desired for some semiconductor devices that a semiconductor disc possess a larger or lower specific electrical resistance in a given inner region than in the marginal regions. For such purposes, the cores can be so chosen that their material has properties which differ from those of the jacket region to be precipitated in accordance with the particular difference required in the ultimate slices to be cut from the finished rod.

Semiconductor bodies of predetermined particular properties can thus be obtained by corresponding choice with respect to kind, composition and quantity of the gas or gas mixture containing the semiconductor material in form of a chemical compound or also a doping addition substance, also by the choice of the temperature at which the cores are maintained during the growing process, and by the choice of the gas-flow speed.

Slices cut from semiconductor rods of relatively large cross section produced in the novel manner can be further subdivided by cutting or scoring, and breaking or etching into many small semiconductor elements; and the invention affords the assurance that these small elements are also equal among themselves with respect to the above-mentioned properties.

Embodiments of the invention will be described presently by way of example with reference to the accompanying drawings in which.

The invention will now be described with reference to the production of monocrystalline semiconductor bodies of silicon which crystallizes in the diamond lattice. It will be understood that this also applies to other semiconductor materials from the fourth group of the periodic system, notably germanium.

Figure 1:
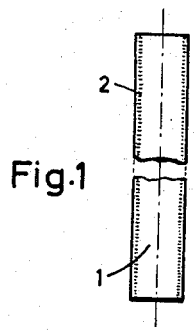
FIGS. 1 and 2 show a lateral view and a top view respectively of a monocrystalline rod having circular cross section.
Figure 2:
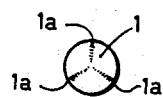

The cylindrical silicon rod shown in FIGS. 1 and 2, having circular cross section, is used as a preliminary core to be later discarded before commencing the production method proper. The core body can be produced from a polycrystalline silicon rod by fusing a monocrystalline seed to one end of the rod and then subecting the rod to zone melting. A cylindrical rod of this kind may also be pulled out of a melt in a crucible. In either case, the production or pulling direction is in the (111)-direction of the crystal lattice structure. Such a rod exhibits three longitudinal facets $1a$ displaced 120° from each other in the peripheral direction, the facets being schematically indicated in FIGS. 1 and 2.

Figure 3:
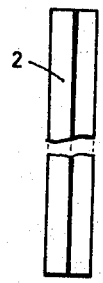
FIGS. 3 and 4 show a lateral view and a top view respectively of the same rod after it has been machined and surface-treated to the shape of a hexagonal prism.
Figure 4:

Such a rod must be subjected to special preparation to make it suitable as a core for pyrolytically dissociating and precipitating from a vaporous current of chemical compound an amount of additional semiconductor material so that it will cause the original monocrystal to grow in thickness without disturbing the crystalline constitution. This requires the removal of material from the surface of the body 1 at least over that perimetric portion of its length at which the just-mentioned monocrystalline growth is to take place; and the surface treatment must convert the shape of the body to that of a regular hexagonal column or prism with three of its six longitudinal edges 120° peripherally displaced from each other and coincident with the above-mentioned facets 1a. The resulting hexagonal cross section is substantially symmetrical with respect to any one of the facet boundaries, corresponding to FIGS. 3 and 4 in which the regular hexagonal column or prism is denoted by 2.

Suitable for processing the core surface in this manner are grinding, sand-blasting, polishing, also bombarding by electrons or/and ions having inert character relative to the semiconductor substance, or a sequence of two or more such mechanical material-removing processes. Successfully employed, for example, has been sand-blasting using quartz sand of 16,900 mesh number according to the German screen-number designation (Literature: D'Ans Lax "Taschenbuch für Chemiker und Physiker," second ediiton, Berlin-Göttingen-Heidelberg 1949, page 1492). The described machining by means of solid agents or mass particles is preferably followed by a chemical process as conventional for the surface treatment of semiconductor bodies, preferably etching by a diluted mixture of nitric acid and hydrofluoric acid.

The hexagonal primary core 2 thus prepared is placed into the reactor vessel in which it is heated to the pyrolytic dissociation temperature of the chemical compound. This is done preferably by passing an electric current lengthwise through the core. The resulting thermal dissocation of chemical semiconductor compound then causes further silicon to grow on the primary core. As to the pyrolytic process, reference may be had to the above-mentioned patent, for example. As explained above, any suitable processing data may be chosen, but the choice must correspond to the properties desired in the ultimate product and, if the ultimate slices to be produced are to have a predetermined and precisely uniform value of specific electric resistance throughout, the process must be exactly the same as the one subsequently employed in the production of the body shown in FIGS. 11 and 12 and described further below.

An example of performing the pyrolytic growth in this manner will be described presently.

Two hexagonal primary cores 2, each prepared as described above, are vertically mounted in a processing vessel corresponding to the one illustrated and described in the above-mentioned application Ser. No. 300,763. The cores are mounted in holders at their respective bottom ends, and the top ends are clamped in matching hexagonal bores of a connecting bridge piece of hyperpure silicon or spectral carbon. During operation, an electric heating current is passed serially through the two cores and the connecting bridge piece. The temperatures of the cores and of the vessel components are continuously measured and kept constant or in accordance with the same time program to be subsequently observed in the actual production.

For starting the operation, core rods 2 are preheated by radiation, for example with the aid of electric arc lamps. Thereafter, when commencing the pyrolysis, a pyrolytic temperature of 1185° C. is produced and maintained by means of electric current as described. (A corresponding temperature for germanium is 850° C.)

In the example here reported, the primary core rods of silicon were 4 cm. thick and 30 to 40 cm. long. Used as a reaction gas was a mixture of trichlorsilane (SiHCl$_3$) and hydrogen in a molar trichlorsilane-to-hydrogen ratio of 0.1 at the flow rate of about 2000 liters per hour. (The numerical process data can be applied when using silicon-tetrachloride (SiCl$_4$) correspondingly diluted with hydrogen.) The silicon substance evolving from the pyrolytic dissociation became attached to the atoms of the crystal lattice structure at the surface of the hexagonal core, and the core grew in diametrical directions and in an oriented manner according to the original monocrystalline crystal structure. As a result, the product (FIGS. 5, 6) of large cross section and 20 to 30 mm. thickness had a continuous monocrystalline structure.

Figure 5:
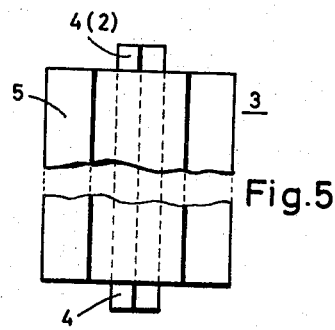
FIGS. 5 and 6 are a lateral view and top view respectively of a monocrystalline body pyrolytically grown upon a prismatic primary core according to FIGS. 3 and 4.
Figure 6:
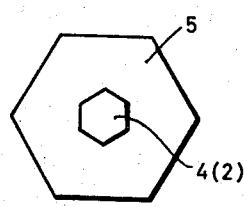

As shown in FIGS. 5 and 6, the monocrystalline body 3 thus produced consists of the original portion 2 and of a new monocrystalline jacket-zone portion 5 stemming from the pyrolytically effected growth. The thickened body also has the shape of a prism or regular hexagonal column. However, the longitudinal edges of the thickened column are displaced 30° in the peripheral direction from those of the original portion 4. This results in either a corner or the center of one side being in the (221) direction of the crystal lattice.

Now, the jacket zone 5 has the predetermined properties resulting from the above-mentioned known and controlled gas composition and other pyrolytic processing parameters, but the core zone 4 does not, or need not, correspond to the desired properties. Therefore, only the jacket zone 5 is used for preparing the secondary core rods to be subsequently used in actual production.

Figure 7:
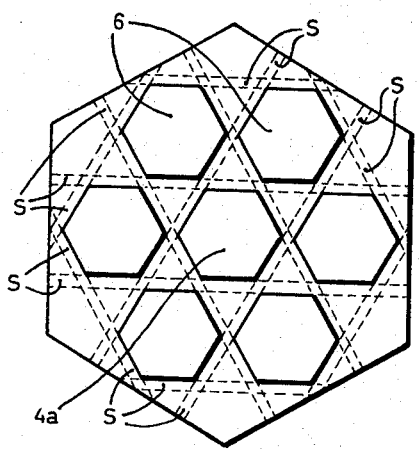
FIGS. 7 and 8 show, on larger scale, respective top views corresponding to FIG. 5 and indicating different ways of cutting the jacket region into a number of secondary core rods to be employed for the pyrolytic production proper.

As exemplified in FIG. 7, the jacket zone 5 is cut into rods shaped as regular hexagonal prisms and of the same length as the jacket zone 5. The particular pattern of subdivision shown in FIG. 7 applies if the resulting individual rods 6 are to be equal in cross section to that of the original portion 4. The hexagonal stud 4 protruding above the top surface of the jacket zone is used as a guide or gauge for correctly placing and orienting the saw cuts.

Figure 8:
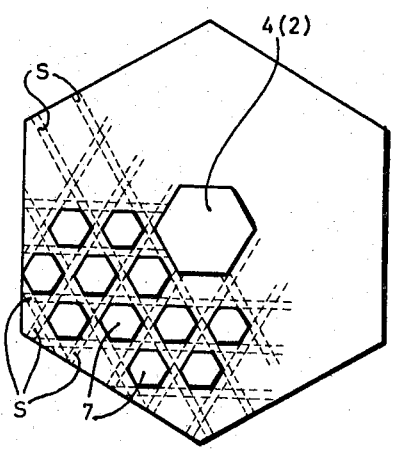

However, the rods 6 cut from the jacket zone 5 may also be given a smaller or a larger cross-sectional area than the portion 4. Thus the secondary rods 7 in FIG. 8 have a smaller cross section.

The size (thickness) is preferably so chosen that the waste resulting from the cutting operation is as small as feasible, consideration also being given to the required mechanical strength of the relatively brittle rods. In cases where given differences, for example of the specific resistance, in a given inner region relative to the surrounding region are to be obtained, the size of the rods cut out of the material can be readily chosen in accordance with this purpose.

After cutting, the rods 6 and 7 are processed by grinding, polishing or/and etching in the manner described above to convert them to accurately regular hexagonal prism, thus making them suitable as cores for the further pyrolytic production of monocrystalline semiconductor rods.

Figure 9:
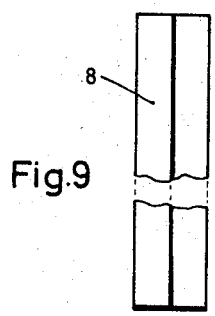
FIGS. 9 and 10 are a lateral view and top view respectively of one of the hexagonal prismatic secondary cores thus obtained.
Figure 10:
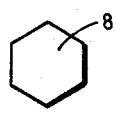

FIGS. 9 and 10 show a monocrystalline prismatic semiconductor rod 8 thus prepared to serve as a core. The rods 8 are now employed, in exactly the same manner as described above in the same pyrolytic apparatus to again perform the same precipitation process, thus increasing the thickness by precipitating monocrystalline material which, as here exemplified, has precisely the same specific resistance and crystalline constitution as the secondary cores 8. In the ultimate state, the secondary core 8 receives a jacket zone 9 according to FIGS. 11 and 12. The entire volume of the rod 8-9 is now produced by identical monocrystalline growing processes. This rod can now be cut, for example perpendicularly to its longitudinal axis, into plate-shaped semiconductor bodies. The entire area of these plates, and hence the entire cross section of the rod, can now be utilized, for example by employing the entire area in the production of semiconductor members as used in silicon controlled rectifiers and other semiconductor controlled switching devices. The production method thus affords the assurance that the electrical properties of these semiconductor bodies are uniform over their entire cross-sectional area. For example, the uniform conductance in the forward direction of such a semiconductor device secures a uniform distribution of the entire current flow between the electrodes. This uniformity in specific current loading is tantamount to increasing the current-carrying capacity of the controllable semiconductor device.

While in the example described above the processing parameters of the production stage performed with the secondary core 8 are identical with those of the preliminary processing stage performed with the hexagonal primary core 4, the method can be modified for obtaining predetermined and controlled differences in the core portion and jacket portion of the plates sliced from the product. Thus, if the plates are to possess a given difference in specific resistance, the process is carried out, for example, in exactly the way described above with the only exception that in the production stage, using the secondary core 8, the molar ratio of the trichlorsilane to hydrogen is reduced from 1.0 to 0.9.

Figure 11:
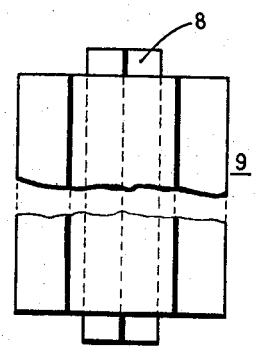
FIGS. 11 and 12 are a lateral view and top view respectively of a monocrystalline body pyrolytically grown in the ultimate production process with the aid of a core according to FIGS. 9 and 10.
Figure 12:
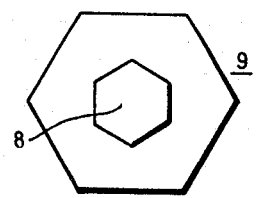

Semiconductor plates cut from rods according to FIGS. 11 and 12, particularly in a direction perpendicular to the prism axis and therefore perpendicular to the (111)-direction of the monocrystal or parallel to the (111)-faces of the crystal lattice, can also be employed to advantage for non-controllable semiconductor devices such as diodes, and then also result in improved uniformiy of the electrical properties.

Figure 13:
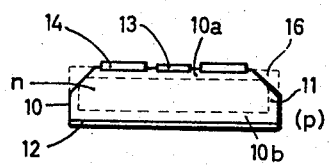
FIG. 13 shows in section an embodiment of a semiconductor device containing a monocrystalline body sliced from a rod according to FIGS. 11 and 12.

FIG. 13 represents in section an embodiment of a silicon controlled rectifier made with a silicon body 10 of uniform specific resistance, sliced from a rod 9 according to FIGS. 11 and 12 by a cut perpendicular to the longitudinal rod axis. The silicon plate 10 is given the desired thickness by grinding or lapping and subsequent etching.

The semiconductor plate 10 as sliced from the hexagonal rod consists of weakly n-conducting silicon. A p-conducting jacket zone 11 is first produced by diffusing acceptor substance, such as aluminum, into the surface region of the plate. Thereafter a foil 12, for example of a gold-boron alloy, is placed against the bottom surface, and a central foil 13, for example of gold-boron alloy, is placed on the top surface and surrounded by a concentric ring-shaped foil which contains donor substance, for example a gold-antimony alloy. The three foils are then alloyed together with the silicon plate 10. After removing from the semiconductor plate a ring-shaped volume portion 16 of triangular cross section, the jacket region 10 is separated into two independent zones 10a and 10b which are both of p-type conductance. The resulting semiconductor device has a p-n-p-n layer sequence to constitute a controlled rectifier in which 12 and 14 are the main electrodes for load current, and 13 is the control (gate) electrode. The source of control voltage is to be connected between the electrodes 13 and 14.

I claim:

1. A method of producing monocrystalline bodies of silicon, germanium and the like semiconductor material, which comprises pyrolytically precipitating the semiconductor material upon an elongated primary monocrystalline core of the semiconductor substance having a crystal axis parallel to the longitudinal axis and having the active ends of crystal-lattice planes at the lateral faces, under pyrolytic processing conditions corresponding to properties intended in the ultimate semiconductor product, and thus growing on said prismatic core a monocrystalline jacket zone having said properties; cutting secondary cores lengthwise from said jacket zone and giving them polygonally prismatic shape to expose active ends of lattice on planes on the lateral faces; and pyrolytically precipitating a further amount of the semiconductor substance upon the secondary cores from a gaseous compound of said substance, also under processing conditions corresponding to properties intended in the ultimate semiconductor product, and thus growing on each secondary core an integrally monocrystalline secondary jacket zone having said properties; whereby the resulting monocrystalline semiconductor body possesses throughout the properties ultimately desired for the intended application.

2. The method of producing monocrystalline bodies according to claim 1 wherein the resulting monocrystals are transversely sliced without intervening melting, each slice containing part of the secondary core and part of the secondary jacket zone.

3. The method of producing monocrystalline bodies of silicon, which comprises pyrolytically precipitating the semiconductor material upon an elongated primary monocrystaline core of the semiconductor substance having a crystal axis parallel to the longitudinal axis and having the active ends of crystal-lattice planes at the lateral faces, under pyrolytic processing conditions corresponding to properties intended in the ultimate semiconductor product, and thus growing on said prismatic core a monocrystalline jacket zone having said properties; cutting secondary cores lengthwise from said jacket zone and orienting the cuts to give the secondary cores a prismatic shape of hexagonal cross section with the crystal lateral faces coincident with (111)-planes of the crystal lattice structure; pyrolytically precipitating a further amount of the semiconductor substance upon the secondary cores from a gaseous compound of said substance, also under processing conditions corresponding to properties intended in the ultimate semiconductor product, and thus growing on each secondary core an integrally monocrystalline secondary jacket zone having said properties.

4. The method of producing monocrystalline bodies of silicon, germanium and the like semiconductor material, which comprises pyrolytically precipitating the semiconductor material upon an elongated primary monocrystalline core of the semiconductor substance having a crystal axis parallel to the longitudinal axis and having prismatic shape of hexagonal cross section so that the prism lateral surfaces coincide with ends of crystal-lattice planes, keeping the ends of the primary core covered during the pyrolytic process and thus growing on said primary core an integral jacket zone of the semiconductor substance from which the primary core ends protrude as hexagonal stumps; cutting lengthwise from said jacket zone a number of secondary cores of hexagonal cross section while using said stumps as a gauge for giving said cross sections of said secondary cores the orientation of the original-core cross section; precipitating a further amount of the semiconductor substance upon the secondary cores from a gaseous compound of said substance and thus growing on each secondary core an integral monocrystalline secondary jacket zone.

5. In the method of producing monocrystalline rods by growing semiconductor silicon from the gaseous phase of a chemical compound thereof on a monocrystalline core heated to a dissociation temperature of said compond, said core having been previously obtained by the same method, the improvement which comprises providing as the core, a prismatic rod whose axis is positioned in parallel with the (111) direction of the crystal lattice, and is sectioned from the monocrystalline-grown edge region of a thicker rod to form an equilateral hexagon as the cross section surface with a corner positioned in the (221) direction of the crystal lattice.

6. The method of claim 5, wherein several hexagonal cores of the same cross section area, are sectioned from a single thicker rod.

7. In the method of producing monocrystalline rods by growing semiconductor silicon from the gaseous phase of a chemical compound thereof on a monocrystalline core heated to a dissociation temperature of said compound, said core having been previously obtained by the same method, the improvement which comprises providing as the core, a prismatic rod whose axis is positioned in parallel with the (111) direction of the crystal lattice, and is sectioned from the monocrystalline-grown edge region of a thicker rod to form an equilateral hexagon as the cross section surface with the center of one side positoned in the (221) direction of the crystal lattice.

References Cited

UNITED STATES PATENTS

| 3,146,137 | 8/1964 | Williams | 148—1.6 |
| 3,152,022 | 10/1964 | Christensen | 148—1.6 |
| 3,168,422 | 2/1965 | Allegretti et al. | 156—17 |
| 3,194,691 | 7/1965 | Dikhoff | 148—1.6 |
| 3,201,665 | 8/1965 | Veneables | 148—1.6 |

WILLIAM L. JARVIS, *Primary Examiner.*

ALFRED L. LEAVITT, *Examiner.*

A. H. ROSENSTEIN, *Assistant Examiner.*